Figures 4, 5:
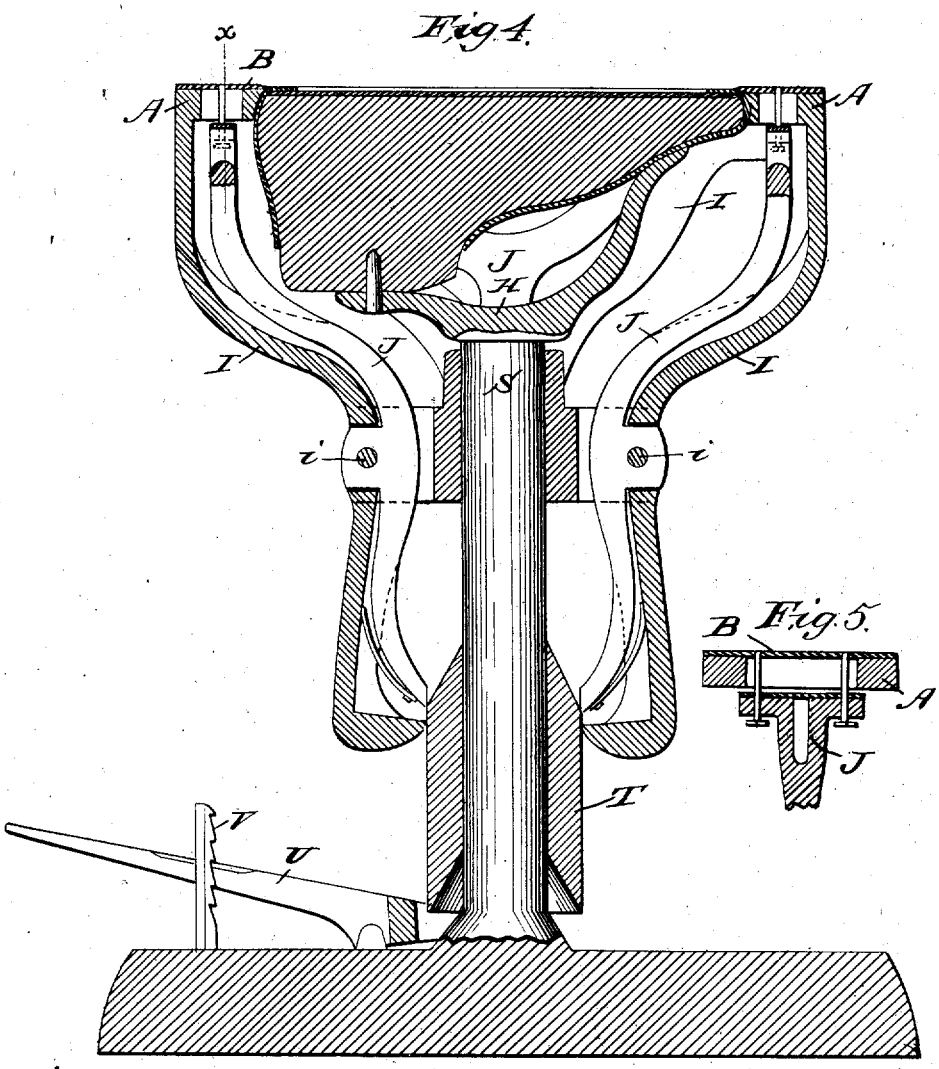

J. Purinton, Jr.
Machine for Lasting Boots and Shoes
No. 1,382. Reissued Jan. 6, 1863.
2 Sheets - Sheet 1.
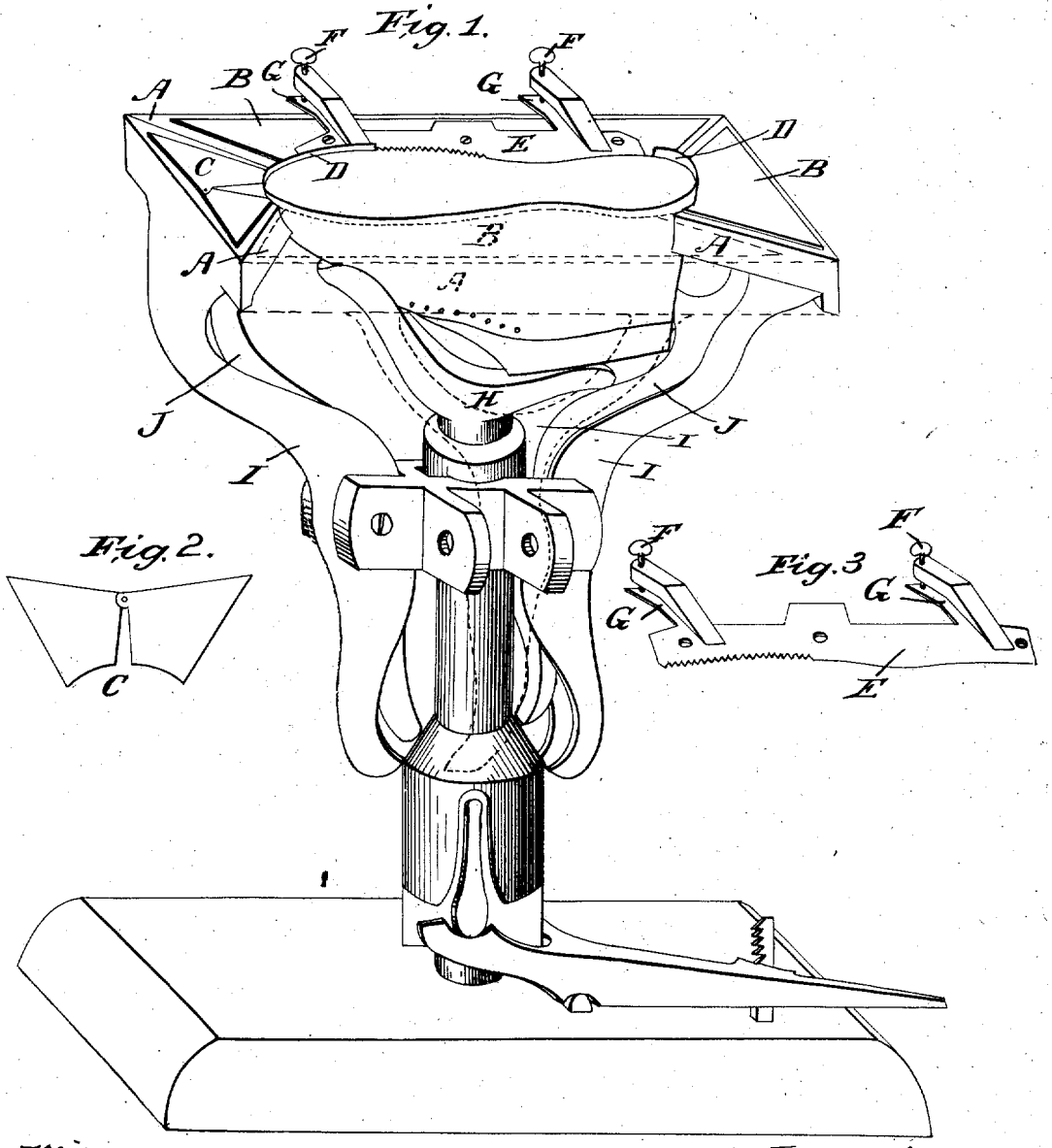
Witnesses
Edwin Walden
J. C. Houghton
Inventor
James Purinton Jr.

J. Purinton, Jr.

Machine for Lasting Boots and Shoes

No. 1,382. Reissued Jan. 6, 1863.

2 Sheets - Sheet 2.

Witnesses

Charles Smith

J. A. Gaubersch mieldt

Inventor.

Martin Wells & Millard

Assignees of J. Purinton

By Munn & Co

Attorneys.

UNITED STATES PATENT OFFICE.

GEO. B. MARTIN, OF DANVERS, AND WILLIAM WELLS, OF BOSTON, MASSACHUSETTS, AND ROBERT MILLARD, OF POUGHKEEPSIE, NEW YORK, ASSIGNEES OF JAMES PURINTON, JR., OF LYNN, MASSACHUSETTS.

IMPROVED MACHINE FOR LASTING BOOTS AND SHOES.

Specification forming part of Letters Patent No. 25,673, dated October 4, 1859; Reissue No. 1,382, dated January 6, 1863.

*To all whom it may concern:*

Be it known that JAMES PURINTON, Jr., of Lynn, in the county of Essex and State of Massachusetts, did invent a certain new and Improved Machine for Lasting Boots and Shoes; and we, GEORGE B. MARTIN, of Danvers, Massachusetts, WILLIAM WELLS, of Boston, Massachusetts, and ROBERT MILLARD, of Poughkeepsie, New York, being the sole proprietors of all right, title, and interest in and to the said invention, do hereby declare that the following is a full and exact description of the same, reference being had to the accompanying drawings, making part of this specification, in which—

Figure 1 is a perspective view of the said machine with one jaw removed. Figs. 2 and 3 are detached views of sliding plates, to be hereinafter described. Fig. 4 is a vertical longitudinal section of the machine. Fig. 5 is a vertical transverse section of a portion of the same at *x x*, Fig. 4.

Similar letters of reference indicate corresponding parts in the several views.

The nature of the said invention consists, first, in the use of clamps for pressing the upper around the last, provided with flanges or edge pieces employed to press the projecting edges of the upper around the edge of the sole; second, in devices for operating the clamping-jaws; third, in improved forms of turning and cutting plates, to be hereinafter described.

To enable others skilled in the art to which the invention appertains to make and use the same, we will proceed to describe its construction and operation.

In the present illustration of the invention, A A A A represent clamp-jaws mounted upon the upper ends of levers I, which are fulcrumed at *i* to a standard, S, on top of which is a holder, H, to receive the last. B B are plates or flanges adapted to project inward from the clamp-jaws A in such a manner that when the upper is clamped by the said jaws its projecting edges will be folded or pressed over or around the edges of the insole or last. In the illustration here given the plates B are fitted to slide within or upon the jaws A and are operated by levers J within the levers I, so that the flanges may project from the jaws only when the latter are compressed. This motion of the flanges or plates B in relation to the jaws A is, however, not essential to the effectiveness of the machine.

T is a sleeve fitted loosely upon the standard S and moved up and down by means of a lever, U, which may be held down by a ratchet-rack, V. The upper end of the sleeve T is of conical or taper form, and as it is thrown up by the depression of the lever U it acts to move the lever I outward and also the levers J, if they be used. In order to press the projecting edge of the upper more smoothly over the last the flange or sliding plate may be hinged, as shown at C and as represented by the detached view, Fig. 2. The slide thus formed will open as it is compressed upon the leather and close as it is withdrawn. E represents a plate attached, by means of screws *e e*, to the jaws A or plates B, in such manner as to adapt it to receive a rocking motion, as hereinafter explained. F F are screws threaded in rigid arms F′ upon the plate E, and bearing upon springs G, which project backward from the said plate. The front edge of the plate E is toothed or serrated to adapt it to cut or roughen the surface of the leather when depressed for that purpose. A separate view of this plate and its attachments is given in Fig. 3.

Operation: The upper is first placed and tacked upon the last, and the latter placed in position upon the holder H, as shown. The lever U being then pressed down elevates the sleeve T, expanding the lower ends of the levers I and J, and thereby drawing in the clamps A B, the lower portion, A, compressing the upper evenly around the last, and the projecting flange B pressing the projecting edge of the upper over the margin of the last or over the edge of the insole. By turning the screws F down upon the springs G the inner edge of the plate E may be pressed down upon the leather at the proper period in the motion of the clamps, and the surface or enamel of the leather will thus be so cut or roughened up that the cement by which the outer sole may be attached will adhere firmly.

The plates or flanges B and C may be adapted and employed either to sever the surplus portion of the upper, or simply to turn over the projecting edges, as before described. The parts may be arranged to impart motion to the said plates or flanges either simultaneously with the motion of the lower part, A, of the clamps, or at any desired period in relation thereto. If moved simultaneously, the said plates or flanges may be permanently attached to or form part of the clamps, projecting inwardly to the required distance from the inner surface of the lower portions, A.

The machine is equally applicable to the manufacture of boots and shoes, whether the soles be secured by pegs, stitches, or cement.

The following is what is claimed as new in the invention of the said JAMES PURINTON, Jr:

1. Compressing the upper around the last by means of clamps provided with projecting plates or flanges to turn the projecting edges of the upper over upon the insole or last in any manner, substantially as described.

2. In combination with any suitable device for holding and supporting the last, the use of a series of clamps moved inward simultaneously by levers, or their mechanical equivalents, to compress the upper upon the last equally on all sides, substantially as hereinbefore explained.

3. The hinged or folding plate C, employed in connection with the clamps A, substantially in the manner described.

4. The cutting or roughening plate E, constructed and operating substantially as and for the purposes set forth.

In testimony of which, as the invention of the aforesaid JAMES PURINTON, Jr., we hereunto set our hands.

GEO. B. MARTIN. [L. S.]
WILLIAM WELLS. [L. S.]
ROBERT MILLARD. [L. S.]

Witnesses for Martin and Wells:
CHARLES HOWE,
JACOB TODD.

Witnesses for Millard:
A. E. BEACH,
M. M. LIVINGSTON.